United States Patent
Davenport

[11] 3,801,891
[45] Apr. 2, 1974

[54] FOUR PHASE STEPPING MOTOR CONTROL

[75] Inventor: Raymond A. Davenport, Okemah, Okla.

[73] Assignee: Oktronics, Inc., Okemah, Okla.

[22] Filed: Aug. 30, 1972

[21] Appl. No.: 284,723

[52] U.S. Cl. .................. 318/696, 310/49, 318/685
[51] Int. Cl. .......................................... H02k 37/00
[58] Field of Search .......... 318/696, 685, 674, 663; 310/49

[56] References Cited
UNITED STATES PATENTS

| | | | |
|---|---|---|---|
| 3,660,746 | 5/1972 | Milek | 318/696 |
| 3,381,193 | 4/1968 | Smith | 318/696 |
| 3,385,984 | 5/1968 | O'Regan | 318/696 |
| 3,445,741 | 5/1969 | Gerber | 318/696 |
| 3,005,941 | 10/1961 | Heggen | 318/696 |
| 3,250,977 | 5/1966 | Heggen | 310/49 X |
| 3,239,738 | 3/1966 | Welch | 310/49 |

Primary Examiner—G. R. Simmons
Attorney, Agent, or Firm—Head & Johnson

[57] ABSTRACT

This invention describes an improved system for controlling a stepping motor for use in driving a perforated paper tape in a tape reading apparatus. The motor is provided with eight poles and corresponding coils which are connected in pairs of diametrically opposite coils. These four sets of coils are driven by a power amplifier that is controlled by two flip-flop circuits. Arrangements are made so that successive identical pulses on an input line will switch one flip-flop then the other then the first, and so on. By this means the magnetic flux in a stepping motor is shifted by 45° of rotation by each successive pulse. The motor has a six pole rotor, and as the flux is shifted by 45° in one direction, the rotor rotates 15° in the opposite direction. Thus, on the application of successive pulses on the input, the rotor advances by 15° in a continuing direction.

2 Claims, 6 Drawing Figures

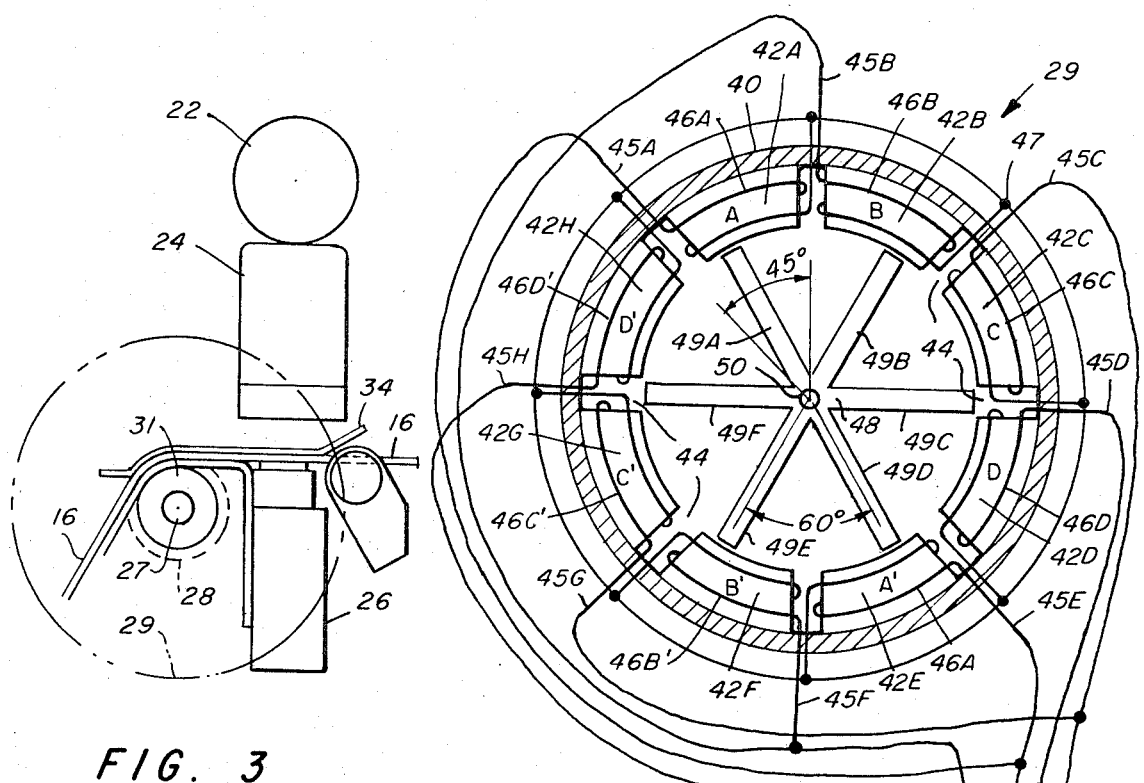
FIG. 3
FIG. 4
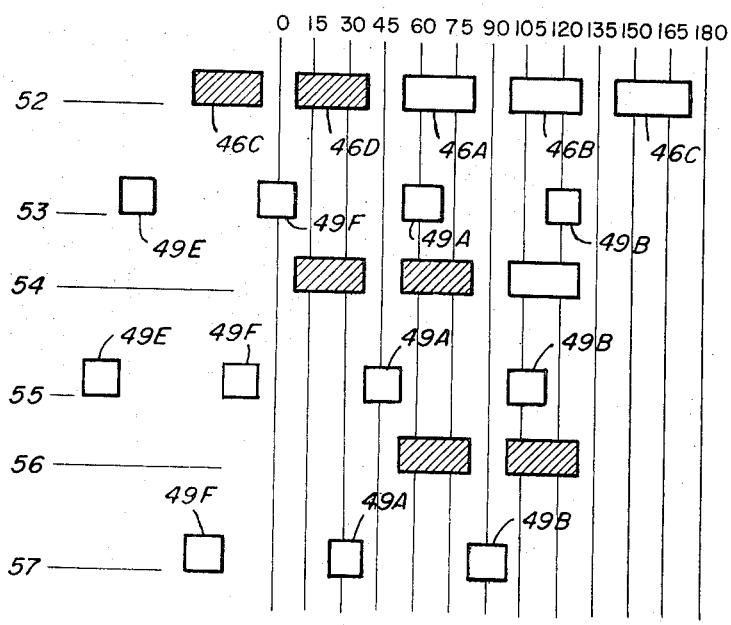
FIG. 5

FOUR PHASE STEPPING MOTOR CONTROL

CROSS REFERENCES TO RELATED APPLICATIONS

This application is related to two copending applications, Ser. No. 284,768 entitled: Tape Drive D. C. Motor Control System, filed Aug. 30, 1972, and Ser. No. 284,779 entitled: Light Potentiometer Drive D. C. Motor Control System, filed Aug. 30, 1972.

BACKGROUND OF THE INVENTION

This invention is in the field of data handling systems. More particularly it is related to perforated paper tape reading devices. Still more particularly it concerns the means for driving a stepping motor for reliably advancing a perforated paper tape in such reading devices.

In the prior art there are numerous devices which utilize the perforations in a strip of paper for recording and reading data. The data are in the form of perforations in rows transverse to the length of the strip. Generally the paper strip has a center column of smaller perforations which are used by a sprocket means driven by a paper drive motor, which advances the strip in incremental movements equal to the spacing between each sprocket hole. In general the strip is advanced one space at a time by a pulse on an input circuit, which advances the drive motor by an incremental angle, such as to drive the paper by the dimension of the spacing between the two sprocket holes. Since the rows of data perforations are aligned with the sprocket holes, each step of the motor will advance a new set of perforations into the reading device, and so on.

It is a primary object of this invention to provide a simplified electronic system, responsive to a series of identical impulses on an input line, to advance a drive motor, or stepping motor, by equal increments of angle so as to advance the perforated tape by equal increments of distance equal to the spacing between the sprocket perforations.

This and other objects are realized and the limitations of the prior art are overcome in the improved apparatus of this invention.

SUMMARY OF THE INVENTION

This invention is concerned with the incremental movement of a prerecorded perforated paper tape through a reading apparatus so that with successive identical impulses on the input connection the perforated tape will be advanced incrementally by the spacings between perforations, and thus between rows of data perforations. The improvement lies in the drive circuit of the motor which drives the sprocket which drives the tape.

The motor is a commercial device which comprises a stator field having eight salient poles with corresponding windings. The windings are connected in pairs, each coil being connected to the diametrically opposite coil. When one pair of coils is powered there will be a diametrical field between the two opposite poles. When two adjacent pairs of poles are simultaneously excited, there will be a diametrical flux, of greater total flux, which will be centered in the gap between the two sets of poles.

If a rotor having an even number of salient poles such as six for example is placed in the motor then a pair of rotor poles will line up diametrically with the direction of the flux set up by the field poles. By exciting a third set of coils and dropping the first set of coils, the flux will be shifted by the spacing of one pole, namely 45°. The rotor will then move correspondingly to align the nearest salient pole to the new flux direction. As will be described below, this will cause a rotation of an angle of 15°. The paper drive sprocket is connected to the shaft of the motor and thus the paper strip is moved by a corresponding dimension, which is equal to the longitudinal spacing of data perforations.

The four sets of coils of the motor are connected to four power amplifiers which are driven through four preamplifiers, which are driven by two sets of flip-flop devices. Each flip-flop has a true and complement output such that when voltage appears on the true output, no voltage appears on the complement output, and vice versa. The first and third set of coils are connected to the true and complement outputs of the first flip-flop. The second and fourth sets of coils are connected to the true and complement outputs of the second flip-flop. By a series of interlock connections, a first input pulse will operate one flip-flop. The second pulse will operate the second flip-flop, the third pulse the first one, and so on, so that on each successive identical input pulse, successive coils in the motor are excited to form an advancing pair of coils, and an advancing flux which will drive the motor in steps of 15°.

BRIEF DESCRIPTION OF THE DRAWINGS

These and other objects of this invention and a better understanding of the principles and details of the invention will be evident from the following description taken in conjunction with the appended drawings in which:

FIG. 3 indicates a generalized tape reading and driving apparatus.

FIG. 4 indicates a schematic diagram of the construction of the drive motor.

FIG. 5 illustrates how on reconnecting the coils the field can be advanced and the rotor similarly advanced.

DESCRIPTION OF THE PREFERRED EMBODIMENT

Figure 2:
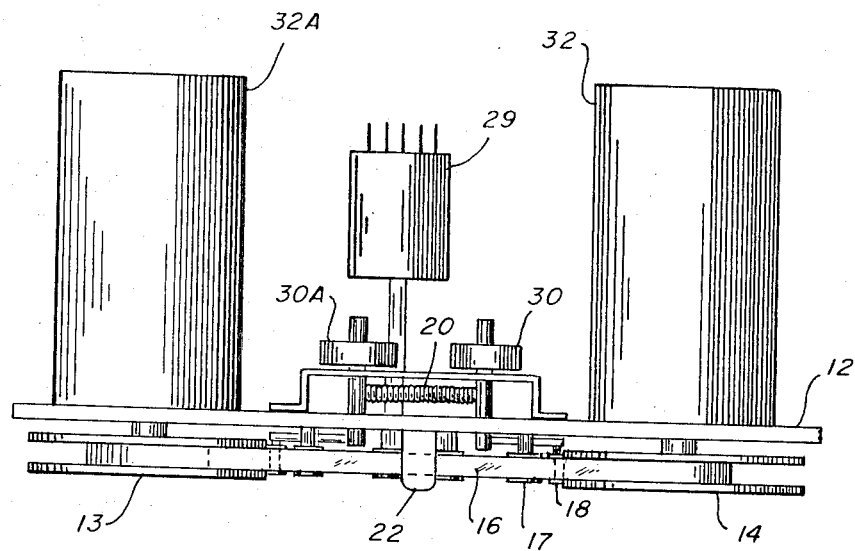
FIGS. 1 and 2 show elevation and plan views of a typical paper drive system such as those to which the motor drive system of this invention would be applied.
Figure 1:
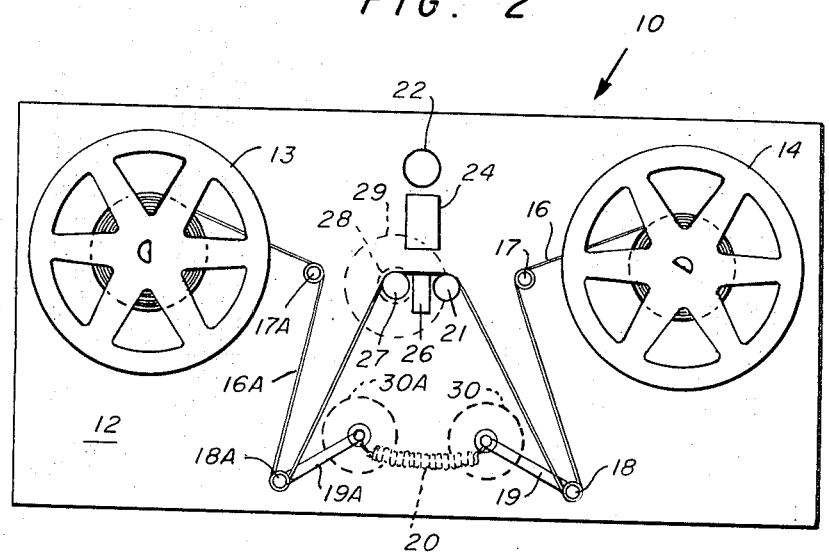

Referring now to the drawings and in particular to FIGS. 1 and 2, the numeral 10 indicates generally a typical tape drive system to which this invention can be applied. There is a transport deck 12 to which are supported the various pieces of apparatus required. There are two tape reels 13 and 14 which are supported on shafts of drive motors 32, 32A, a tape 16 is reeled off of the reel 14 over an idler pulley 17 and over an idler pulley 18 which is mounted on a dancer arm 19 which is supported in bearings in the plate 12. The dancer arm shaft is connected to a sensor 30 which can be of several different types, such as a potentiometer, for example.

The tape then passes over an idler 21 through the tape reading apparatus which will be described in connection with FIG. 3, over a tape drive sprocket 28, around the idler 18A, on a second dancer arm 19A, over idler 17A, and is wound on to the reel 13. The tape drive motor or stepping motor 29 is mounted behind the panel 12 and drives the shaft 27 which supports the sprocket 28.

Referring now to FIG. 3, the tape 16 passes between elements 24 and 26. The element 22 is a lamp, 24 is an optical system which provides eight sets of focused beams, which pass downward to a corresponding group of eight photoelectric detectors in the box 26. These beams are spaced apart in a direction perpendicular to the tape 16 to correspond to the prescribed spacing of the eight columns of perforations, which represent the data punched into the tape. In the center of the tape, between the eight columns of perforations, there is a central column of smaller perforations, having equal longitudinal spacing. This center row of perforations is for the driving and positioning of the tape 16. This is accomplished by a sprocket shown dashed as elements 28 which is mounted on and driven by the shaft 27. Element 34 is for the purpose of guiding the paper tape through the reading apparatus. Dashed outline 29 corresponds to the outer diameter of the motor which is mounted behind the panel. The size and dimensions of the motor sprocket, etc., are so designed that when the motor shaft 27 rotates by an angle of 15° the sprockets will rotate a corresponding angle and will drive the paper longitudinally by a dimension of 1/10 inch which is the spacing along the tape of the rows of perforation. Thus each rotation of the shaft of 15° positions a new set of perforations under the reading apparatus.

Refer now to FIG. 4. The drive or stepping motor is shown schematically as a cylindrical shell 40 with a plurality of inwardly projecting poles 42A, 42B, 42C . . . 42H. These are spaced apart by an angle of 45° and have a space 44 between them, such that coils can be inserted over the poles. The coils are indicated by the numerals 46A, 46B, 46C . . . 46H. The coils wound around the poles are connected in pairs with coils wound around opposite poles, so that when one is excited they are both excited, and there will be a diametrical flux between the two poles. Consequently it is possible to number the poles and coils in terms of A, B, C, D, A', B', C', and D', there being four sets or pairs of coils rather than eight coils. This will require only four sets of amplifiers, one connected to each of the sets of coils. Each coil has an input lead such as 45A, 45B, 45C, 45D, and an input common lead 47.

Supported in the center of the stator in bearings, is a rotor 48 mounted on a shaft 50. This rotor has six radial poles. When a diametrical flux is set up by a pair, or two pairs, of poles the rotor will turn in such a way as to align one of its set of colinear radial poles in-line with the flux, and will be essentially locked into that position. Now when the diametrical flux is advanced by an angle of 45° there will be no rotor poles aligned with it. The nearest pole will be one which is 15° away and therefore being the nearest pole the rotor will turn 15° to align this pole into the diametrical flux. Thus, for each advance of the field flux of 45° the rotor will advance by 15°.

This can be seen more clearly in connection with FIG. 5. The elements 46C, 46D, 46A, 46B, shown as rectangles along the line 52 represent the field poles which are laid out on a flat plane. The angle between these poles is represented by numerals 0, 15, 30, 45, etc., which represent degrees. In the line 53 are squares represented by numerals 49E, 49F, 49A, 49B, etc. These represent the poles of the rotor. On the assumption that coils 46C and 46D are excited, (as shown by the cross-hatching), the diametrical flux will align itself with the zero degree line, and the rotor will pull in so that one pole, such as 49F, is aligned with the direction of the flux, the zero degree line. In line 54 the cross hatching shows that coils 46D and 46A are now exited and the diametrical flux will be in alignment with the 45° line, the flux having advanced from the zero degree to the 45° line. With the flux now at 45°, and the rotor poles in accordance with the position on line 53, it is seen that pole 49A is now 15° away from the flux while pole 49F is 45° away from the flux. When the coils 46D and 46A are excited, the flux transfers to the 45° line, pole 49A moves to the left to align itself with the flux, and the position of the rotor is now shown in line 55, where the pole 49A is aligned with the flux. With the poles 46A and 46B excited, as shown in line 56, the flux now moves to 90° angle, the pole 49B is now 15° away from the flux and is pulled into alignment as shown in line 57.

Provided the connections can be switched to the coils in accordance with diagram of FIG. 5, it is seen that when the coils are excited in successive pairs, the flux will move to the right, which represents a clockwise rotation of the flux. The rotor will move to the left in a counterclockwise direction, by an angle of 15° for each 45° advanced of the flux. What is required now is an electronic system for providing the proper switching of the coils in response to a successive series of identical pulses. This will be described in connection with FIG. 6.

Figure 6:
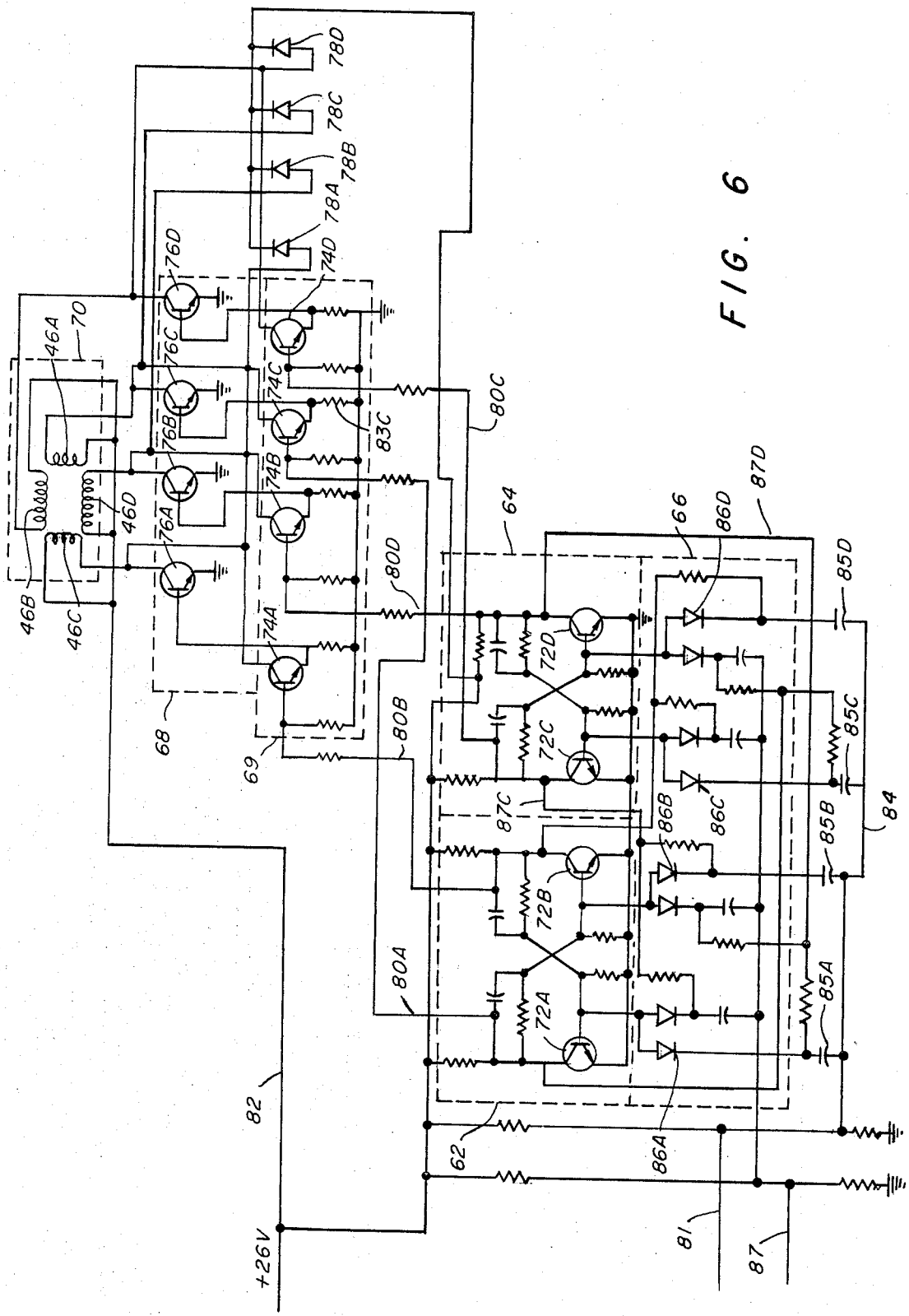
FIG. 6 is a schematic wiring diagram of the drive system for the motor.

FIG. 6 represents schematically the drive system for the stepping motor 29. The dashed rectangle 70 represents the four sets of coils 46 of the motor 29. The dashed rectangle 68 represents four power amplifiers which are connected to and drive the four sets of coils of the motor. The dashed rectangle 69 represents schematically the four preamplifiers which drive the four power amplifiers 68. The dashed rectangle 62 represents the first of the two flip-flops, and rectangle 64 represents the second of the two flip-flops. Numeral 66 represents the interlock system by means of which successive pulses on the input line operate one flip-flop and then the other, and then the first and so on.

Consider the first flip-flop 62. This has two transistors 72A and 72B and it has two outputs 80A and 80B. The first output 80A is called a true output and the second, 80B is called a complemenet output. Similarly, the second flip-flop 64 has a true output 80C and a complement output 80D.

If the coil pairs are numbered in sequence around the motor there will be a first pair, a second pair, third pair, fourth pair, first pair, second pair, etc. In operation there are always two pairs excited at the same time. For instance, the first and second pairs will be excited. On the next impulse the first pair is disconnected and the third pair is excited, so that the field now is set up by the second and the third pairs. On the next impulse the second pair is disconnected and the fourth pair is excited so that the field now is set up by the third and fourth pairs. It is seen that the true output 80A of the first flip-flop controls the transistor 74C which controls the power amplifier 76C. The power amplifier 76C controls the coil pair 46A. The complement output 80B of the first flip-flop controls the peramplifier 74A which controls the power amplifier 76A which controls the coil pair 46C.

Incidentally while the four coils are shown as being 90° apart they are, as previously described only 45° apart and so the coil 46C is now 90° away from coil 46A. Referring to the second flip-flop 64 the true output 80C is connected to the preamplifier 74D which drives the power amplifier 76D which controls the coil pair 46B and the complement output 80D controls the preamplifier 74B which controls the power amplifier 76B which controls the coil pair 46B.

At the start, consider that the flip-flop 62 true output 80A has a voltage on it and correspondingly the true output 80C of flip-flop 64 has a true voltage on it, so that coils 46A and 46B will be excited. On the next impulse on input line 81, flip-flop 62 will switch the true output 80A off and switch the complement output 80B on, which will cause power amplifier 76A to provide power to the coil pair 46C and, of course, the true output 80C of the flip-flip 64 is still connected so that coils 46B and 46C are now excited. Thus, this first switching of this first flip-flop has dropped coil 46A and added coil 46C and 46C and 46B are excited and the flux has been shifted 45°. On the next pulse on the input line 81, the second flip-flop is switched from the true to the complement output and voltage now is applied to line 80D to preamplifier 74B of power amplifier 76B to coil 46D. Meanwhile the true output 46B has been disconnected. Power is supplied to the coil pairs 46C and 46D and the resultant flux is now shifted by another 45°. On the next pulse the flip-flop 62 will then revert back to the true output, and on the succeeding pulse flip-flop 64 will revert from the complement to the true output, and conditions will be the same as at the starting point.

Looking at the circuit in more detail it is seen tha when the transistors 72A to 72D have a high voltage, this occurs when they are not conducting. With a voltage on line 80A for instance, or when the transistor 72A is non-conducting the potential of line 80A rises almost to the potential of the supply voltage on line 82. Thus, the base lead of the transistor 74C is raised, the transistor 74C conducts and the voltage across the emitter resistor 83C rises, causing the base of the transistor 76C to rise, and the transistor 76C conducts current through the coil 46A from the power supply voltage on lead 82, to ground. In other words by cutting off transistor 72A the transistor 76C is made to conduct and in a sense, with one end of the motor coil connected to positive supply voltage on line 82, the transistor connects the other lead to ground. This provides essentially full voltage across the coil pair 46C.

This same procedure happens when any of the four transistors are connected. It is a property, of course, of the flip-flop that only one or the other of the transistors 72A, 72B for example, can conduct simultaneously. When one starts conducting the other is automatically extinguished. So by connecting the two outputs 80A and 80B to sets of coils which are 90° away, a single operation of the flip-flop 62, for instance, will cause the first coil to be disconnected and the second coil 90° away to be connected. The same type of operation is carried on with the flip-flop 64.

While the transistor 72A is not conducting and its true output voltage 80A is high, the transistor 72B is conducting. Its collector is near ground potential and this voltage applied through emitter follower transistor 74A to driver transistor 76A cuts off the current through the winding 46C so when winding 46A is conducting 46C must have no current, and vice versa. Similarly transistor 72C is cut off permitting current to flow through winding 46B while transistor 72D is conducting cutting off the current through winding 46D.

In this condition a trigger pulse applied to the input line 81 goes to a trigger bus 84. This bus is connected to condensers 85A, 85B, 85C and 85D. The junction of condenser 85A and diode 86A is held near ground potential by the collector of conducting transistor 72D which goes by way of lead 87D. The positive-going transition on the pulse on the trigger bus, differentiated through condenser 85A is blocked by diode 86A. However, the negative-going transition drives the cathode of diode 86A more negative than the anode. Diode 86A then conducts, driving the base of transistor 72A more negative. Since transistor 72A is already cut off this pulse has no effect.

The invention of condenser 85B and diode 86B is held at a positive potential by the collector of nonconducting transistor 72C by a lead 87C so that neither portion of the trigger pulse differentiated through condenser 85B can drive the cathode of transistor 72B more negatives than its anode. Diode 86B therefore does not conduct and a trigger is not felt on the base of the transistor 72B. Thus the first pulse is not effective in changing the conduction of transistor 72A or 72B. Similarly a high voltage level at the junction of condenser 85C and diode 86C isolates the trigger from the base of the transistor 72C but a low voltage at the junction of condenser 85D and diode 86D permits a negative spike to reach the base of transistor 72D. Transistor 72D is driven out of saturation the current through the collector resistor is reduced and the potential applied to the base of transistor 72C. Transistor 72C goes into conduction driving the base of transistor 74D further negative. The result is that transistor 72C is driven into saturation while transistor 72D is cut off.

In a similar manner additional pulses on the input line 81 will cause successive operation of the two flip-flops as has been indicated previously. Successive pulses on input line 81 will cause the operations indicated previously to cause a clockwise rotation of the motor field which will cause a counterclockwise rotation of the rotor. A similar connection 87 for the input pulses will operate the flip-flops in a slightly different order which will then cause a rotation of the magnetic flux to be in a counterclockwise direction and the rotor will rotate in a clockwise direction. This will constitute a reverse rotation of the motor and will cause a reverse movement of the paper strip.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a perforated paper tape reading system including:

means to store, drive, reel and unreel the perforated paper tape, and including photoelectric means to read the perforations in said tape;

said means to drive said tape comprising means to cause linear movement of said tape past said reading means in accordance with the angular rotation of a tape drive shaft;

said drive shaft driven by a stepping motor designed to advance its shaft a selected angular increment of rotation in response to an electrical signal;

said motor having eight poles spaced at 45° around the stator, and a rotor with six salient poles spaced at 60°, each stator pole having a coil, each coil having a diametrically opposed coil with which it is connected, to form four pairs of coils, the improvement in electrical control means comprising:

input control means responsive to identical sequential input pulses;

means responsive to a first pulse to said input control means to provide power to a first and to a second adjacent coil pair 45° displaced from said first coil pair; and means responsive to a second pulse to said input control means to disconnect said first coil pair and connect power to a third adjacent coil pair 45° displaced from said second coil pair and 90° displaced from said first coil pair;

said control means including interlock means including first flip flop means for sequentially applying power to said first and third coil pairs, and second flip flop means for sequentially applying power to said second and fourth coil pairs;

whereby the magnetic field set up in a diametrical direction by said two coil pairs will rotate by an angle of 45° in response to said input pulse, and said rotor will turn by an angle of 15° in the direction opposite to the rotation of said field.

2. In a tape drive system in which said tape is driven in incremental steps, and including a stepping drive motor having four pairs of diametrically opposed poles spaced at 45° around the stator, each pole having a coil, the eight coils connected into four diametrically opposed pairs, the rotor of said motor having six salient poles spaced 60° apart, the improvement comprising control means for advancing the diametrical magnetic flux set up by said pairs by an angle of 45° in response to a pulse to the input of said control means, comprising:

a. a first, second, third and fourth amplifier means, connected respectively to a first, second, third and fourth pair of coils;

b. a first and second flip-flop means, each having a true and a complement output, such that when voltage appears on one output it disappears from the other;

c. the true output of the first flip-flop connected to the first amplifier which is connected to the first coil pair;

d. the complementary output of the first flip-flop connected to the third amplifier which is connected to the third coil pair which is spaced 90° from said first coil pair;

e. the true output of said second flip-flop connected to the second amplifier which is connected to said second coil pair between, and 45° from, said first and third coil pairs;

f. the complement output of said second flip-flop connected to the fourth amplifier which is connected to the fourth pair of coils, which is 90° from the second pair of coils; and g. means, including interlock means, which in response to a series of pulses on the input to the control means will:

1. on the first pulse flip the first flip-flop from true to complement, thus disconnecting power from the first coil pair and connecting power to the third coil pair; whereby power will be on the second and third coil pairs;

2. on the second pulse flip the second flip-flop from true to complement, thus disconnecting the second coil pair and connecting power to the fourth coil pair, whereby power will be on the third and fourth coil pairs;

3. on the third pulse flop the first flip-flop from the complementary to the true connection, thus disconnecting power from the third coil pair, and connecting power to said first coil pair, whereby power will be on the fourth and first coil pairs; and 4. on the fourth pulse flop the second flip-flop from the complementary to the true, switching power from the fourth coil pair to the second coil pair whereby power will be on the first and second coil pairs;

whereby as each pulse is received the direction of the diametrical magnetic field set up by the four coil pairs, operating two at a time, will advance 45°.

* * * * *